United States Patent [19]

Brophy

[11] Patent Number: 5,221,229
[45] Date of Patent: Jun. 22, 1993

[54] FISH SCALING APPARATUS

[76] Inventor: Neil Brophy, 52 Washington St., Ste. 9, Marblehead, Mass. 01945

[21] Appl. No.: 778,709

[22] Filed: Oct. 18, 1991

[51] Int. Cl.$^5$ .............................................. A22C 25/02
[52] U.S. Cl. ...................................... 452/105; 452/98; 452/101
[58] Field of Search .................... 452/105, 102, 97, 98, 452/99, 101, 104

[56] References Cited

U.S. PATENT DOCUMENTS 4,063,332  12/1977  McCullough ...................... 452/105

FOREIGN PATENT DOCUMENTS 1101621  3/1981  Canada ................................ 452/105
0384166  1/1965  Switzerland ....................... 452/105

*Primary Examiner*—Willis Little

[57] ABSTRACT

A tool for scaling fish includes a handle with a shaft rotatably mounted to the handle and projecting therefrom. A generally cylindrical scaling head is engaged on the shaft and rotated at a high speed. The scaling head has a circular array of relatively wide ribs spaced around its periphery and extending the length of the head. Each rib has a substantially flat top wall and flat angled sidewalls so as to form relatively sharp parallel wedge-shaped corners at the tops of the ribs. When the tool head is brought into contact with a fish, the moving ribs strip away the fish scales efficiently and effectively without damaging the underlying flesh of the fish.

10 Claims, 2 Drawing Sheets

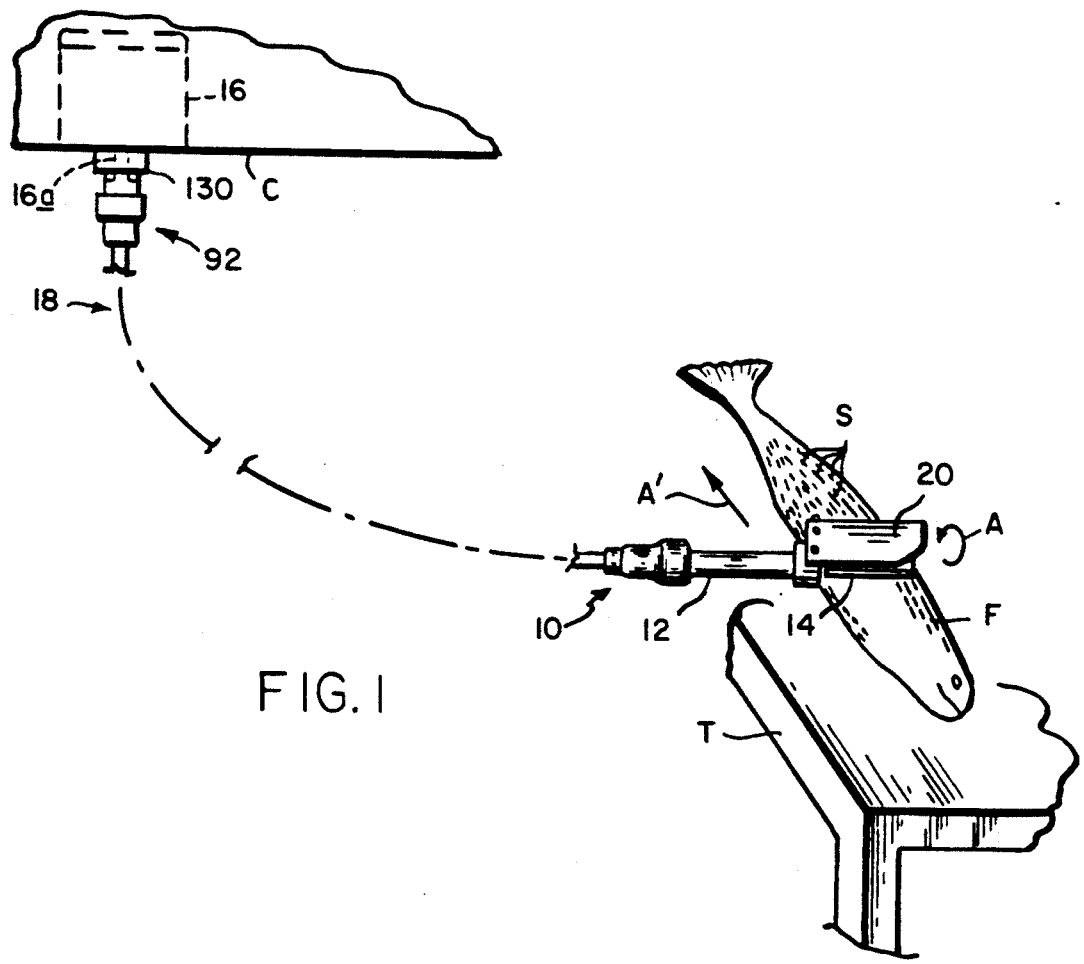
FIG. 1
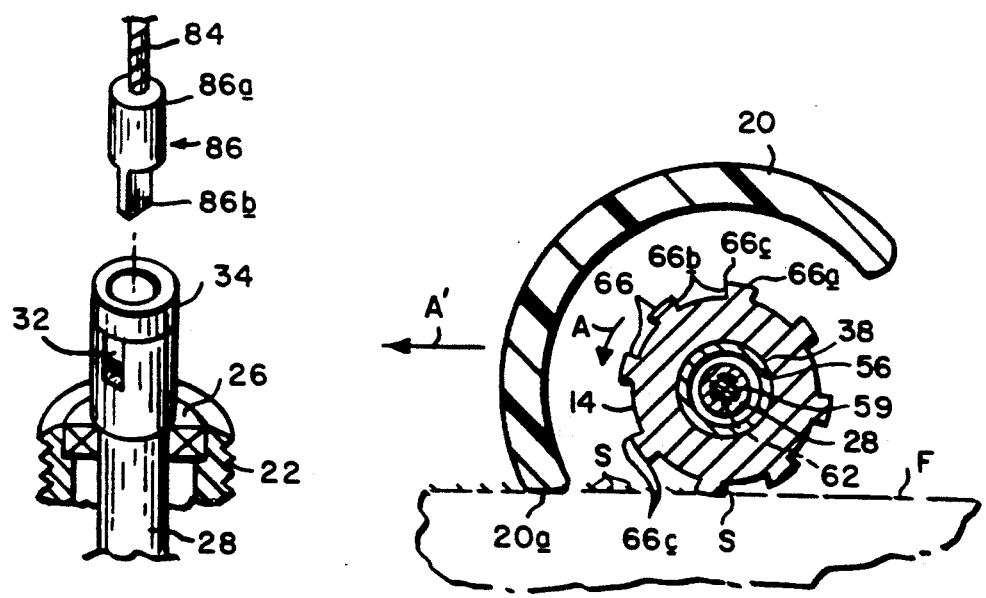
FIG. 4
FIG. 3

FISH SCALING APPARATUS

BACKGROUND OF THE INVENTION

After some fish are caught, it is customary to remove their scales prior to marketing, freezing or otherwise processing the fish. The scaling operation is often carried out using a motorized rotary scaling tool having a generally cylindrical scaling head or blade rotatably mounted on its axis to a handle. The head is rotated at a relative low speed, e.g., less than 1500 rpm, by an appropriate electric motor.

In use, a worker holding the tool by its handle strokes the head along the fish such that the head is rotating against the grain of the fish. The rotating head engages the scales and strips them from the flesh of the fish. Some prior scaling tools are provided with a rigid protective cover which extends over the scaling head to shield the worker's fingers from the head and to prevent the removed fish scales from flying up into the worker's face.

Prior fish scaling tools are disadvantaged, however, in that the impacts of the scaling head against the fish during the scale removal process tend to soften the flesh of the fish which is undesirable from a marketing standpoint. Also, if even a small hole is made in the fish during scale removal, the prior tools tend to grab and rip out the flesh of the fish through that hole thereby reducing the fish in value or even making it unmarketable.

The above problems with the prior scaling tools stem primarily from the designs of their scaling heads. One common type of head comprises a cylinder having closely spaced raised bosses distributed around its circumference. When the fish is engaged by the rotating head, the bosses, constituting localized pressure points, smash into the fish and disrupt and soften the fish flesh. Also, the leading edges of the bosses, while removing the scales, also tend to tear into the underlying fish flesh. Still further, scales tend to fill the spaces between the bosses, reducing the scaling efficiency of the tool.

Another type of prior scaling head of which we are aware comprises a cylindrical stack of metal washers. The washers are slit radially and sectors of the washers are twisted so that the head resembles a stack of miniature propeller blades. When this type of tool is stroked along the fish, the edges of those blades tend to cut and otherwise damage the fish flesh in the process of removing the scales from the fish.

Damage to the fish may also occur due to the protective shields or covers that overlie the heads on prior scaling tools. This is because when the worker moves the tool along the fish, the leading edge of the shield is usually pressed against the fish along with the head. This localized pressure on the fish contributes to softening of the fish flesh.

The head shield also interferes with the proper operation of the scaler because the removed scales tend to accumulate in the space between the head and the shield. In practice, it is difficult to dislodge those scales without removing the shield from the head. In addition, while the shield protects the worker's face from flying scales, it can be a cause of injury to the worker's fingers. This is because as the worker manipulates the tool over the fish, he may inadvertently position one or more fingers in the space between the rigid shield and the spinning head such that the fingers are actually wedged against and cut by the rotating head.

Prior scaling tools are also disadvantaged in that their scaling heads have a relatively short working life, one reason being their fixed polarities. In other words, in use, they must be rotated in a selected direction against the fish. The resultant constant engagements of the leading edges of the head against the relatively abrasive fish scales can dull those edges so that the head no longer strips scales from the fish in an efficient and effective manner. When this occurs, the heads are usually thrown away because it is impractical, if not impossible, to resharpen those edges.

The prior scaling tools have other limitations which impair the ability of the worker using those tools to scale fish in the most expeditious and economical manner. For example, some tools are relatively heavy and thus contribute to operator fatigue; some tools are unwieldy. Some tools have heads which only work effectively on fish of a certain type or within a certain size range.

It would be desirable, therefore, if there existed a fish scaling tool that is lightweight and easy to use and which removes the scales from most fish efficiently without damaging the fish.

SUMMARY OF THE INVENTION

Accordingly, it is an object of the present invention to provide an improved fish scaling tool.

Another object of the invention is to provide a tool of this general type which is lightweight and easy to use.

A further object of the invention is to provide a fish scaling tool which does not cut or soften the flesh of the fish during the scale removal process.

A further object of the invention is to provide a tool for scaling fish which does not present a hazard to the user of the tool.

A further object of the invention is to provide a tool of this type which has a relatively long useful life.

Still another object of the invention is to provide such a tool which can remove scales efficiently from most types of fish without otherwise damaging the fish.

Other objects will, in part, be obvious and will, in part, appear hereinafter. The invention accordingly comprises the features of construction, combination of elements and arrangement of parts which will be exemplified in the following detailed description, and the scope of the invention will be indicated in the claims.

Briefly, my tool comprises a handle which houses a rotary shaft one end of which projects from the handle. Mounted to the projecting end of the shaft, coaxially therewith, is a tubular scaling head. The head has axial and radial symmetry so that it can be mounted to the shaft from either end, i.e., it is reversible.

The outer surface of the head is formed with a circular array of relatively wide longitudinal ribs or blades which extend the full length of the head, the ribs being spaced apart appreciably from one another. The tops of the ribs are flat. The sides of the ribs are also flat and they are angled or tapered so that the blades are wider at their tops than at their roots; that is, they are somewhat wedge-shaped in cross section. Resultantly, a pair of relatively sharp parallel edges is present at the top of each rib.

The opposite end of the rotary shaft in the tool handle is connected via a relatively long flexible shaft to the shaft of a motor capable of rotating the head at a relatively high speed, in the order of 1700 to 3500 rpm. The motor is most conveniently mounted close to the ceiling over the work area.

As is the case with prior tools of this general type, my tool includes a shield over the scaling head to protect the operator. In my tool, however, the shield is made of a relatively soft, flexible, resilient plastic material which, while effectively protecting the worker's face from flying fish scales, is also able to flex sufficiently to prevent the worker's fingers from being trapped under the shield and wedged against the rotating scaling head.

The tool is composed of parts which are relatively inexpensive to make in quantity. Furthermore, these parts are designed and assembled so that the inner workings of the tool cannot become jammed by fish scales and other debris generated during the scaling process. Finally, the tool is lightweight and compact so that a worker can use the tool for a relatively long time without becoming fatigued.

When scaling a fish, the operator holds the tool by its handle and sweeps the rotating scaling head along the fish from head to tail with the head rotating against the grain of the fish. The wedge-shaped leading corners of the rapidly moving ribs effectively pick up and strip away a swath of scales along the path of the head. Since each rib is relativly wide and extends the entire length of the head, the rib contacts the fish over a relatively large area so that localized pressure on the fish is kept to a minimum. Also, the widths and spacings of the ribs are such that at the high speeds involved, the ribs spend a large percentage of their time performing a head supporting function rather than a scaling function. Resultantly, the tool is able to lift up and strip away the fish scales without appreciably softening or digging into the flesh of the fish underneath those scales.

Even the tool's head shield helps to minimize damage to the fish in that the leading edge margin of that sheild, being soft and flexible, is able to conform to the shape of the fish so that the shield helps to support and guide the tool as the tool is drawn along the fish during the scale removal process.

BRIEF DESCRIPTION OF THE DRAWINGS

For a fuller understanding of the nature and objects of the invention, reference should be had to the following detailed description, taken in connection with the accompanying drawings in which:

FIG. 1 is a fragmentary isometric view of a fish scaling tool in accordance with my invention;

FIG. 3 is a sectional view taken along line 3—3 of FIG. 2, and

FIG. 4 is a fragmentary exploded view showing elements of the FIG. 1 tool in greater detail.

DESCRIPTION OF THE PREFERRED EMBODIMENT

Figure 2:
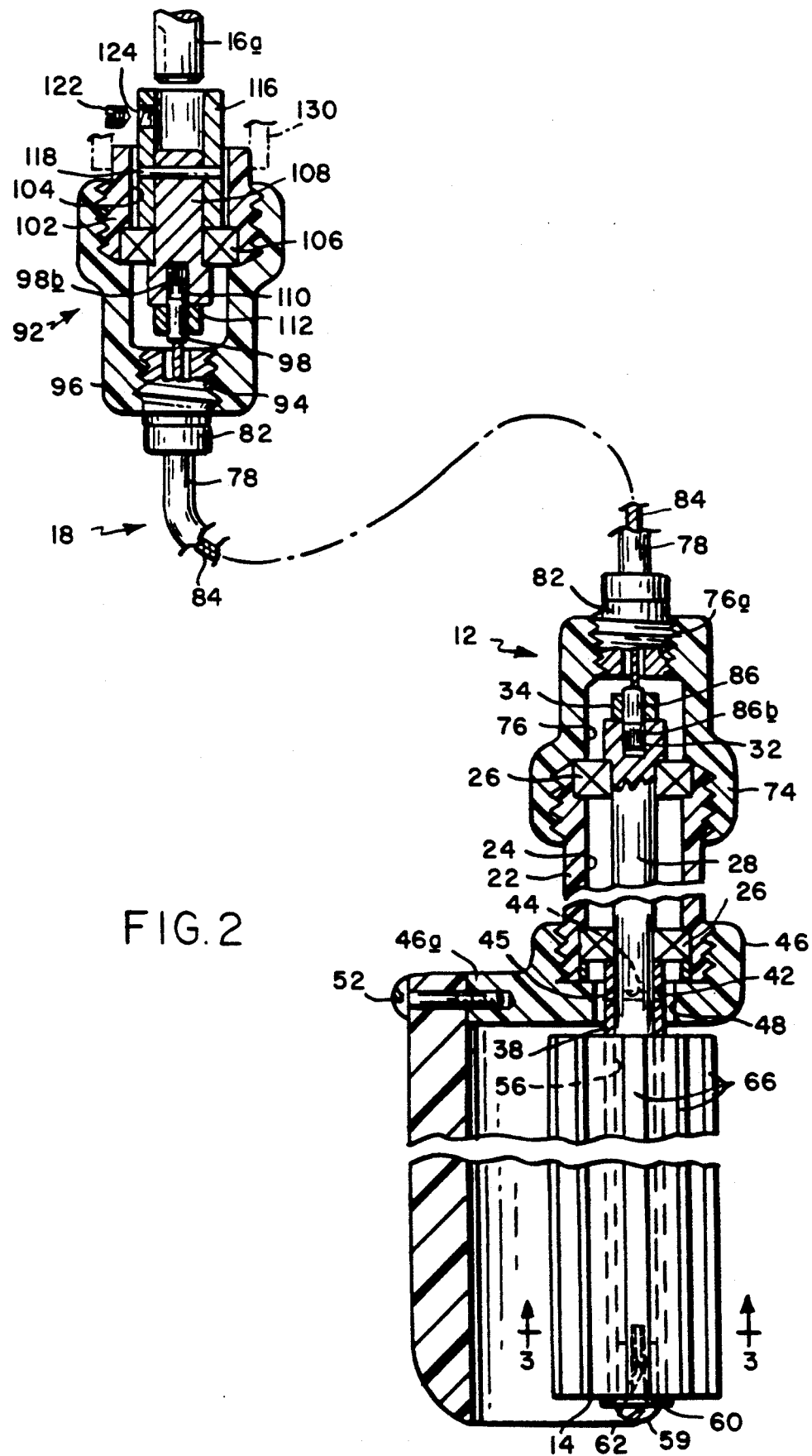
FIG. 2 is a sectional view with parts shown in elevation showing the FIG. 1 tool in detail.

Referring to FIG. 1 of the drawings, my tool, indicated generally at 10, is shown as it would be used to scale a fish F shown lying on the table T. Tool 10 comprises a lightweight tubular handle 12 which supports a rotary scaling head 14 projecting from the end of handle 12. Head 14 is rotated about its longitudinal axis by an electric motor 16 shown as being mounted in a ceiling C over the table T. Motor 16 has a driven shaft 16a which is coupled to the scaling head 14 by means of a flexible rotary shaft system 18 which will be described in greater detail later. Motor 16 is a high speed motor capable of rotating head 14 at a speed in the range of 1700 to 3500 rpm in the direction of the arrow A shown in FIG. 1 so that the motion of the head surface adjacent to fish F is against the grain of the fish.

To use the tool 10, a worker standing in front of table T may grasp the head of the fish F with his right hand and hold the tool handle 12 with his left. He may then stroke the tool along the fish from head to tail in the direction of the arrow A' so that the head 14 engages the side of the fish. The rapidly rotating head 14 lifts up and strips away the scales S where the head contacts the fish, creating a scaleless swath along the fish as shown in FIG. 1. With a few such passes of the tool 10, all of the scales on both sides of the fish may be removed quickly and efficiently without otherwise damaging the fish.

To protect the operator, tool 10 includes a flexible resilient protective shield 20 mounted to handle 12. The shield extends around the top and sides of head 14 to prevent the rotating head from propelling loosened fish scales up into the face of the operator.

Referring now to FIGS. 2 and 4, handle 12 is seen to comprise a tubular barrel 22 having a central passage 24 whose opposite ends are countersunk to provide seats for a pair of circular bearing units 26. A shaft 28 extends along the axis of barrel 22 through the bearing units 26, being rotatively fixed to the inner races of those bearing units. The upper end of shaft 28 extends to the top of barrel 22 and it is slotted axially to provide a keyway 32. Preferably, a ring 34 is welded to the upper end of the shaft and the open sides of the slot below ring 34 may be closed by weld material or solder (not shown).

Shaft 28 projects appreciably beyond the lower end of barrel 22, that projecting end segment of the shaft being encircled by a sleeve 38 which extends from the bearing unit 26 appreciably beyond the lower end of the shaft. A pin 42 extending through a diametric hole 44 in the shaft and through registering holes 45 in sleeve 38 rotatably and axially fix the sleeve to the shaft.

The lower end of barrel 22 is threaded to receive a correspondingly threaded end cap 46. This end cap is provided with an axial passage 48 to provide clearance for shaft 28 and sleeve 38. Cap 46 also includes an exterior semicircular flange 46a which provides a mounting surface for the tool's head shield 20. The illustrated shield consists of a semi-cylindrical piece of relatively soft, flexible, resilient, transparent plastic material such as low density polyethylene. Preferably, it is relatively thick, e.g. ⅛ inch and is about 5 inches long. Shield 20 may be secured at one end to flange 46a by suitable threaded fasteners 52 so that it overlies, and is closely spaced, e.g., ¼ inch, from head 14. When secured to flange 46a, shield 20 retains its shape and is substantially impervious. Yet, it is relatively soft to the touch and flexible to the extent that its free end segment can be flattened and bent out away from head 14 to a substantial extent. Moreover, since the shield is transparent, it does not obstruct the worker's view of the area of the fish being scaled.

Referring now to FIGS. 2 and 3, the scraper head 14 is a generally cylindrical tubular member machined or otherwise formed of a hard, noncorrosive material such as stainless steel or ABS plastic. Preferably, it is axially and radially symmetric. Head 14 is provided with an axial passage 56 for snugly receiving the free end segment of sleeve 38. The head may be retained on the shaft by a threaded fastener 59 which extends through a washer 60 into the open end of the head passage 56 and is turned down into a threaded passage 62 in the end of shaft 28.

Head 14 is formed with a circular array of longitudinal ribs 66. The illustrated head, which is about 3 inches long and has an outer diameter of about 1¼ inch, has 8 such ribs distributed uniformly around the head, with each rib being in the order of ¼ to 5/16 inch wide and about ¼ inch high. Preferably, the spacing of the ribs should be in the order of 2 to 3 times the rib width. Ribs 66 are squared off so that their top or outer surfaces 66a are flat. The sidewalls 66b of each rib are also flat. Moreover, they are undercut so that in cross section, each rib is wedge-shaped. That is, each rib is wider at its top or outer wall 66a than it is at its root. Desirably, the incline or taper angle of the rib sidewalls 66b should be in the range of 5 to 20 degrees. This forms at the top or outer end of each rib a pair of relatively sharp parallel wedge-shaped corners or cutting blades 66c.

Referring to FIGS. 2 and 4, the upper end segment of the handle barrel 22 is threaded to receive a correspondingly threaded end cap 74. End cap 74 has an axial passage 76 to allow connection of the flexible cable system 18 to shaft 28.

Cable system 18 comprises an outer 78 sleeve or sheath whose opposite ends are provided with threaded metal fittings 82. Actually, sleeve 78 may consist of a conventional high pressure hydraulic hose whose end fittings have been drilled out to enlarge the openings through those fittings. In any event, the sleeve encloses a flexible shaft 84 of the type capable of transmitting torque, e.g. a tightly wound wire coil. The lower end of shaft 84 is terminated by a key 86 as best seen in FIG. 4. Key 86 comprises a cylindrical barrel 86a and a generally rectangular tab 86b which projects from the closed end of barrel 86a. Barrel 86a is arranged to receive the lower end of cable 84 which may be secured within the barrel by solder, crimping or other appropriate means.

As shown in FIG. 2, the upper end segment 76a of the end cap passage 76 is threaded to accept the threaded end fitting 82 of sleeve 78. Perferably, the threaded segments of passage 76 and fitting 82 are tapered so that the fitting can be screwed into and out of the passage by hand. The key 86 at the end of the cable shaft 84 is long enough so that when the end cap 74 is turned down on the handle barrel 22, the key tab 86b extends into the slot or keyway 32 at the upper end of shaft 28 with the barrel 86a being encircled by the ring 34 at the upper end of the keyway 32. This connection rotatably couples the shaft 84 firmly to shaft 28 and the scaling head 14.

The upper end of the flexible shaft system 18 is coupled to motor 16 by a coupling shown generally at 92 in FIG. 2. Coupling 92 is similar to the coupling at the upper end portion of handle 10 depicted in FIGS. 2 and 4. That is, the upper end fitting 82 of sleeve 78 is threaded into a tapered threaded passage 94 in an end cap 96 which is similar to end cap 74. Also, the upper end of the flexible cable 84 is terminated by a key 98 which is substantially identical to key 86. End cap 96 threadedly engages over the end of a short barrel 102 having an axial passage 104 which is counterbored from below to provide a seat for a circular bearing unit 106. Extending along passage 104 and through bearing unit 106 is a short shaft 108 which rotates with the inner race of the bearing unit. The lower end of shaft 108 is slotted axially to provide a keyway 110 and a ring 112 is welded to the lower end of the shaft at the mouth of the slot in the same manner described above for ring 34 on shaft 28. When the end cap 96 is screwed to barrel 102, the tab 98b of key 98 projects into slot 110 thereby rotatably coupling the upper end of the flexible shaft 84 to shaft 108 in the same manner shown in FIG. 4 for the lower end of shaft 84.

The upper end of shaft 108 projects from the upper end of the barrel 102 so that it can snugly accept a sleeve 116. Sleeve 116 is rotatably and axially secured to shaft 108 by means of a pin 118 which extends diametrically through the shaft and through registering holes in sleeve 116 in the same manner as pin 42 described above. The upper end of sleeve 116 is, in turn, arranged to snugly receive the shaft 16a of motor 16. The sleeve 116 and motor shaft are rotatably coupled together by a set screw 122 threaded into a hole 124 in the wall of sleeve 116. The screw bears against motor shaft 16a preferably at a flat thereon. A collar 130 (FIG. 1) down from motor 16 engages and rotatably fixes barrel 102. Thus, when the motor shaft 16a rotates, the torque is coupled via the flexible shaft 84 to the shaft 28 in the tool handle 12 and thence to the scaling head 14.

Tool 10, constructed as aforesaid, is lightweight and easy to use. Preferably, the flexible shaft system end fittings 82 incorporate swivels so that a worker holding the tool by its handle 12 can maneuver the head 14 over the fish quite easily. With each pass of the head along the fish, the wedge shaped corner edges 66c effectively and efficiently strip away the fish scales. Yet, due to their large surface areas and high surface speed, the ribs cause minimal softening or other damage to the underlying fish flesh. Actually, one can hold the moving head against one's hand without causing any appreciable pain, let alone any damage, to the hand. Yet the ribs 66 are still very effective in removing the scales from the fish.

The relatively wide spacing of ribs 66 around the head 14 and the high speed of the head combine to prevent buildup of scales between the ribs. Those same factors minimize the buildup of fish scales between head 14 and the shield 20. Even if scales should adhere to the underside of shield 20, they can be removed easily because the shield can be flexed and bent away from the head so that one can gain access to the underside of the shield for cleaning purposes.

When using the tool 10, the handle 12 is preferably oriented so that the leading edge 20a of the shield 20 contacts the fish as shown in FIG. 3 to help support and guide the scaling head 14 over the fish as discussed above. Here, however, the guide is able to conform to the fish so that it does not exert localized pressure on the fish. Thus, the shield 20 makes the scaling operation less tiring for the worker, yet also minimizes damage to the fish.

The fact that the shield 20 is soft and flexible also means that if the operator's fingers should find their way into the space between the rotating head 14 and the shield, the shield is free to flex so that the fingers will not be wedged against, and damaged by, the moving ribs 66.

For all the above reasons, tool 10 should suffer a minimum amount of downtime.

Even though the scaling head 16 is made of stainless steel, the scaling blades, i.e. the leading corners 66c of head ribs 66, may tend to loose their edge over time because of the highly abrasive nature of the fish scales S. However, as noted above, the head 14 is radially and axially symmetric so that it is completely reversible end-to-end on shaft 28. When so reversed, the other set of corners 66c of ribs 66 will become the leading or working corners that are advanced into contact with the fish when the head is rotated in the same direction. Alternatively, tool 10 may be connected to a motor 16 whose armature rotates in the opposite direction to achieve the same effect.

The components of tool 10, save for head 14, are conventional metal or plastic parts that can be purchased or made at relatively low cost. The head 14, on the other hand, can be made using known machining or milling techniques. Therefore, the tool is within the means of the average fish processor.

While we have described tool 10 primarily as a fish scaler, it is obvious that the tool can also be used to remove the outer coverings from other products such as avicados, pineapples, etc. For products with softer coverings, a brush may be used in lieu of head 14, the brush having rows of bristles corresponding to the head ribs 66.

It will thus be seen that the objects set forth above, among those made apparent from the preceding description, are efficiently attained. Also, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

I claim:

1. A fish scaling tool comprising
 a handle;
 a shaft rotatably mounted to the handle and projecting therefrom;
 means for rotating the shaft, and
 a generally cylindrical head mounted coaxially to the shaft, said head having a circular array of ribs spaced around its periphery and extending the length of the head, said ribs being at least as wide as they are high and having substantially flat top walls and substantially flat side walls so as to form pairs of relatively sharp parallel corners at the tops of the ribs.

2. The tool defined in claim 1 wherein each rib is narrower at the root of the rib than at the top thereof so that, in cross section, each rib is wedged-shaped.

3. The tool defined in claim 2 wherein the wedge angle is 5 to 20 degrees.

4. The tool defined in claim 1 wherein the ribs have similar widths and spacings, and the rib spacing is 2 to 3 times the rib width.

5. The tool defined in claim 4 wherein each rib is narrower at the root of the rib than at the top thereof so that, in cross section, each rib is wedge-shaped.

6. The tool defined in claim 5 wherein the head has axial and radial symmetry so that the head can be reversed on said shaft.

7. The tool defined in claim 1 wherein the rotating means comprise
 an electric motor, including an armature, spaced from said shaft, and
 a flexible rotary cable rotatably connected at its opposite ends to said armature and shaft, respectively.

8. The tool defined in claim 1 and further including a flexible, resilient shield mounted to said handle and overlying said head.

9. The tool defined in claim 8 wherein said shield is generally semi-cylindrical and extends about one half way around the head a relatively short distance from the head ribs.

10. The tool defined in claim 1 wherein the rotating means rotate the head at a speed of 1700 to 3500 rpm.

* * * * *